US007922206B2

(12) United States Patent  
Kriezel

(10) Patent No.: US 7,922,206 B2
(45) Date of Patent: Apr. 12, 2011

(54) UPRIGHT SEATED SNOWBOARD

(76) Inventor: James Kriezel, Hewlett Harbor, NY (US)

( * ) Notice: Subject to any disclaimer, the term of this patent is extended or adjusted under 35 U.S.C. 154(b) by 345 days.

(21) Appl. No.: 12/112,555

(22) Filed: Apr. 30, 2008

(65) Prior Publication Data
US 2009/0273175 A1 Nov. 5, 2009

(51) Int. Cl.
B62B 17/00 (2006.01)

(52) U.S. Cl. ...................................................... 280/845
(58) Field of Classification Search .................. 280/812, 280/826, 14.1, 845, 15
See application file for complete search history.

(56) References Cited

U.S. PATENT DOCUMENTS

| | | | | |
|---|---|---|---|---|
| 768,977 A * | 8/1904 | Clark et al. | ............... | 280/28.14 |
| 1,447,094 A * | 2/1923 | Luhrs et al. | ............... | 280/28.14 |
| 1,569,885 A * | 1/1926 | Robblee | ............... | 280/25 |
| 1,655,713 A * | 1/1928 | Scoville | ............... | 280/21.1 |
| 1,954,830 A * | 4/1934 | Richards | ............... | 188/8 |
| D93,132 S * | 8/1934 | Richards | ............... | D12/10 |
| 2,062,953 A * | 12/1936 | Wargo | ............... | 280/28.14 |
| 2,447,700 A * | 8/1948 | Hassman | ............... | 280/28.14 |
| D157,137 S * | 2/1950 | Foster | ............... | D12/10 |
| D178,325 S * | 7/1956 | Nelson | ............... | D12/10 |
| 2,781,200 A * | 2/1957 | Robison | ............... | 280/826 |
| D183,837 S * | 11/1958 | Hammond | ............... | D21/767 |
| 2,910,708 A * | 11/1959 | Albright | ............... | 441/65 |
| 3,003,778 A * | 10/1961 | Taggart | ............... | 280/28.14 |
| 3,026,120 A * | 3/1962 | Achille | ............... | 280/28.15 |
| 3,145,399 A * | 8/1964 | Jackson | ............... | 441/72 |
| 3,150,880 A * | 9/1964 | Gust | ............... | 280/16 |
| 3,190,668 A * | 6/1965 | Husak | ............... | 280/28.14 |
| 3,297,334 A * | 1/1967 | Jenks | ............... | 280/28.14 |
| 3,319,971 A * | 5/1967 | Thomas et al. | ............... | 280/16 |
| 3,325,179 A * | 6/1967 | Bissett | ............... | 280/25 |
| 3,336,038 A * | 8/1967 | Cohen | ............... | 280/28.15 |
| 3,628,804 A * | 12/1971 | Carreiro | ............... | 280/18 |
| 3,632,125 A * | 1/1972 | Krippelz | ............... | 280/14.1 |
| 3,635,483 A * | 1/1972 | Barriball et al. | ............... | 280/610 |
| 3,744,811 A * | 7/1973 | Johnston | ............... | 280/28.14 |
| 3,778,077 A * | 12/1973 | Johnson | ............... | 280/28.14 |
| D232,164 S * | 7/1974 | Bemis | ............... | D12/10 |
| 3,830,513 A * | 8/1974 | Hunt | ............... | 280/28.14 |
| 3,917,301 A * | 11/1975 | Fabris | ............... | 280/28.14 |
| 4,094,528 A * | 6/1978 | Cluzel | ............... | 280/610 |
| 4,114,912 A * | 9/1978 | Sweeney | ............... | 280/28.15 |
| 4,199,162 A * | 4/1980 | Joy | ............... | 280/28.14 |
| 4,310,169 A * | 1/1982 | Brough | ............... | 280/14.1 |
| 4,324,409 A * | 4/1982 | Larsen et al. | ............... | 280/14.1 |
| 4,349,208 A * | 9/1982 | Merrill | ............... | 280/28.14 |
| 4,491,333 A * | 1/1985 | Warnke | ............... | 280/28 |
| 4,537,412 A * | 8/1985 | Hill | ............... | 280/7.12 |
| 4,632,408 A * | 12/1986 | Olpp et al. | ............... | 280/28.14 |
| 4,650,198 A * | 3/1987 | Sherretts | ............... | 280/28.14 |
| D291,427 S * | 8/1987 | Schaller et al. | ............... | D12/10 |

(Continued)

Primary Examiner — J. Allen Shriver, II
Assistant Examiner — Jacob Meyer
(74) Attorney, Agent, or Firm — Carter, Deluca, Farell & Schmidt, LLP

(57) ABSTRACT

A snowboard is provided. The snowboard includes a board having an upturned head, an upturned tail and longitudinal extending runners and/or channels along a bottom surface thereof, a seat portion extending upward from the board at a location between the head and tail, the seat portion including a top surface and opposite lateral sides, wherein the top surface is configured for seated engagement by a rider and the opposite lateral sides are configured to accommodate the legs of the rider, and a pair of hand grips extending outward from the opposite lateral sides near its top surface. The opposite lateral sides may include a waist configured to accommodate the feet of the rider.

17 Claims, 7 Drawing Sheets

U.S. PATENT DOCUMENTS

| | | | | |
|---|---|---|---|---|
| 4,722,539 A * | | 2/1988 | Molinaro | 280/28.14 |
| D303,416 S * | | 9/1989 | Strauss | D21/767 |
| 4,865,572 A * | | 9/1989 | Andes | 441/72 |
| 4,886,283 A * | | 12/1989 | Wells | 280/14.1 |
| D322,052 S * | | 12/1991 | Prox | D12/9 |
| D325,765 S * | | 4/1992 | Grantz et al. | D21/767 |
| 5,116,067 A * | | 5/1992 | Johnson | 280/7.14 |
| 5,135,249 A * | | 8/1992 | Morris | 280/609 |
| 5,145,195 A * | | 9/1992 | Campbell et al. | 280/28 |
| 5,344,167 A * | | 9/1994 | Strouth | 280/14.1 |
| D353,561 S * | | 12/1994 | Bedro | D12/10 |
| D359,543 S * | | 6/1995 | Tiramaui | D21/760 |
| D366,922 S * | | 2/1996 | Doty, Jr. | D21/767 |
| D374,641 S * | | 10/1996 | Gaul | D12/9 |
| 5,566,959 A * | | 10/1996 | Tiramani | 280/28.14 |
| 5,599,030 A * | | 2/1997 | Campbell et al. | 280/28 |
| D390,500 S * | | 2/1998 | Walker | D12/9 |
| D405,142 S * | | 2/1999 | Benzel | D21/767 |
| 6,019,380 A * | | 2/2000 | Goodman et al. | 280/28.14 |
| 6,036,202 A * | | 3/2000 | LaCome | 280/28.14 |
| 6,179,305 B1 * | | 1/2001 | Capozzi et al. | 280/28.14 |
| 6,416,065 B1 * | | 7/2002 | Bibollet | 280/28.14 |
| 6,431,562 B1 * | | 8/2002 | Vontobel | 280/28.14 |
| D466,834 S * | | 12/2002 | Oldendorph | D12/10 |
| 6,601,858 B1 * | | 8/2003 | Farley | 280/25 |
| 6,634,657 B2 * | | 10/2003 | Graham | 280/14.27 |
| 6,736,414 B2 * | | 5/2004 | Farrally-Plourde | 280/16 |
| 6,857,641 B2 * | | 2/2005 | Bobrowicz | 280/14.21 |
| 6,866,273 B2 * | | 3/2005 | Barbieri et al. | 280/14.21 |
| 6,905,128 B1 * | | 6/2005 | Lear et al. | 280/16 |
| 6,910,695 B2 * | | 6/2005 | Ellington | 280/14.22 |
| 7,204,496 B2 * | | 4/2007 | Rawcliffe | 280/14.21 |
| 7,219,916 B2 * | | 5/2007 | Olson | 280/609 |
| 7,503,568 B1 * | | 3/2009 | Mehrmann | 280/18 |
| 7,547,023 B2 * | | 6/2009 | Yau | 280/16 |
| 2001/0040352 A1 * | | 11/2001 | Wang et al. | 280/87.01 |
| 2002/0030333 A1 * | | 3/2002 | Graham | 280/14.27 |
| 2002/0121765 A1 * | | 9/2002 | Wolf | 280/609 |
| 2006/0197294 A1 * | | 9/2006 | Yau | 280/16 |
| 2009/0014995 A1 * | | 1/2009 | Gulbranson | 280/809 |
| 2010/0109310 A1 * | | 5/2010 | Gulbranson | 280/816 |

* cited by examiner

US 7,922,206 B2

UPRIGHT SEATED SNOWBOARD

BACKGROUND

1. Technical Field

The present disclosure relates broadly to snow sports. More particularly, this disclosure relates to a snowboard having an upright seat with integrated hand holds and foot rests.

2. Background of Related Art

Snow sports are very popular throughout the world in areas where the climate permits the accumulation of a sufficient amount of snow. Traditionally, the two most popular snow spoils were skiing and sledding. More recently, snowboards have become very popular. Snowboarding, like skiing, generally requires standing up on the snowboard. Both skis and snowboards are typically equipped with foot bindings which connect to the user's boots.

Sledding is generally not performed standing up. Many sleds are designed to carry a person lying down on the sled either prone or supine (luge toboggan for example). Some sleds are provided with seats upon which one or more "passengers" may sit. Sometimes these sleds are horse drawn.

Over the years there has been much experimentation in different forms of sleds and skis. The patent literature is rich with examples of single skis with seats of some sort attached. Most of these combinations appear awkward.

Therefore, it would be beneficial to have a snowboard configured for operable engagement by a seated rider.

SUMMARY OF THE INVENTION

A snowboard is provided. The snowboard includes a board having an upturned head, an upturned tail and longitudinally extending runners and/or channels along a bottom surface, a seat portion extending upward from the board at a location between the head and tail, the seat portion including a top surface and opposite lateral sides, wherein the lop surface is configured for seated engagement by a rider and the opposite lateral sides are configured to accommodate the legs of the rider, and a pair of hand grips extending outward from the opposite lateral sides near its lop surface.

The opposite lateral sides may include a waist configured to accommodate the feet of the rider. The waist may be narrow. The top surface of the seat portion may be a concave curved surface. The seat portion may be closer to said tail than said head. The board and seat portion may be constructed of plastic. The board and seal portion may be formed of a single piece. The seal portion may include a beveled front wall and a beveled rear wall. The board may he reinforced with a lattice of ribs. The seat portion is secured to the board using mechanical fasteners.

The board may be constructed by rotational molding, injection molding, growing or milling. The seat portion may be constructed by rotational molding, injection molding, growing or milling.

DETAILED DESCRIPTION

Figure 4:
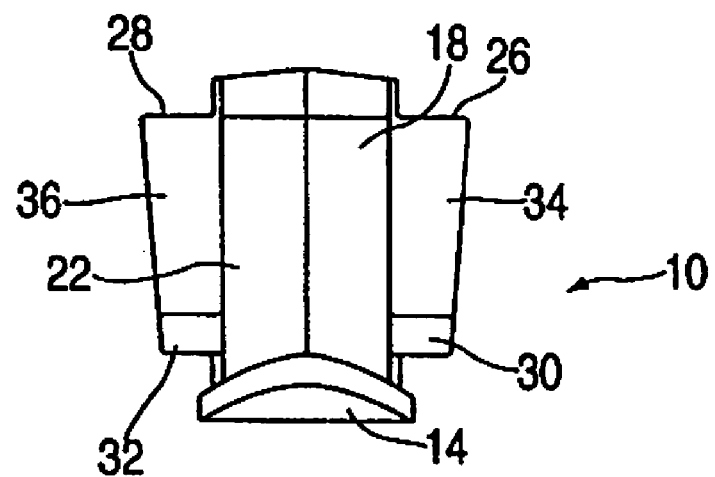
FIG. 4 is a front elevation view of the snowboard of FIG. 1.

Turning now to the figures generally, the snowboard 10 according to aspects of the present disclosure is constructed of molded plastic, and may be formed from a single piece of rotationally molded plastic. Alternatively, the snowboard 10 may compose two or more pieces and may be milled, grown, injection molded or formed in any other suitable manner. The snowboard 10 includes a bottom board 12 having an upturned head 14 and an upturned tail 16 as seen best in FIGS. 1 and 5. An upstanding seat portion 18 extends upward from the bottom board 12 at a location between the head 14 and the tail 16, as seen best in FIGS. 1, 4, and 5. Preferably, the seat portion 18 is located slightly closer to the tail 16 as seen in all of the figures except FIG. 4. This is necessary to give the snowboard a proper center of gravity when a rider is sitting on the seat portion.

Figure 1:
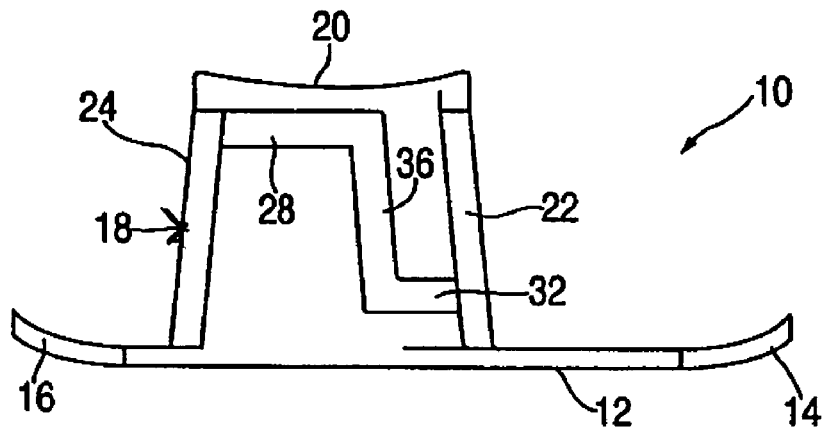
FIG. 1 is a side elevation view of a snowboard according to a first embodiment of the invention.
Figure 2:
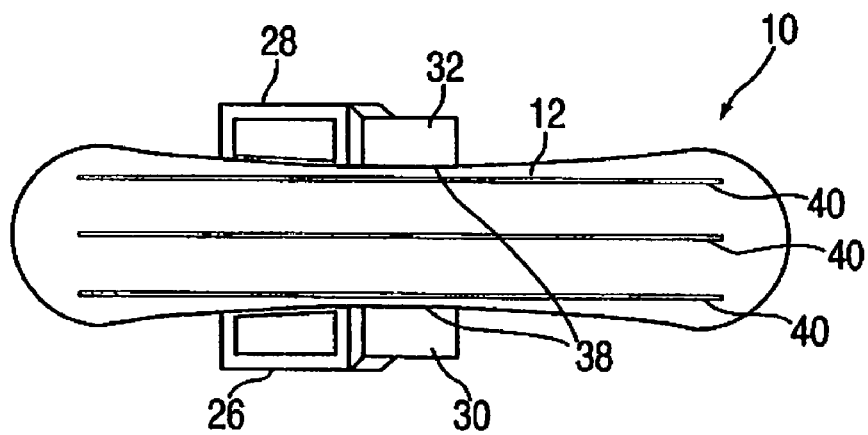
FIG. 2 is a bottom plan view of the snowboard of FIG. 1.
Figure 3:
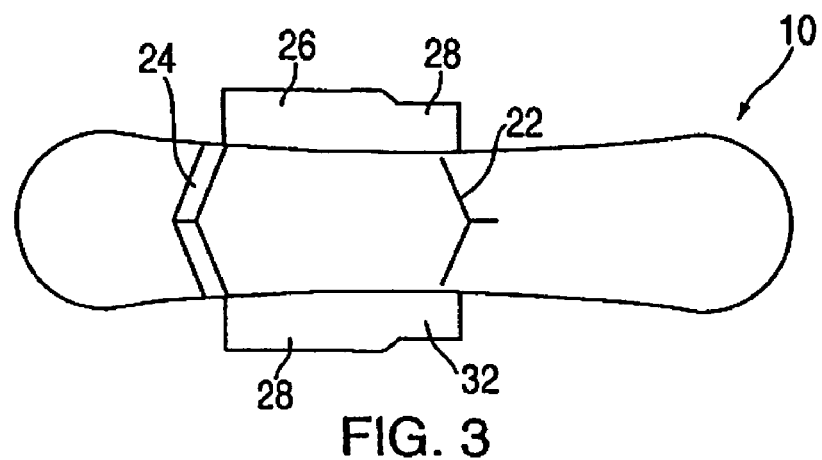
FIG. 3 is a lop plan view of the snowboard of FIG. 1.
Figure 5:
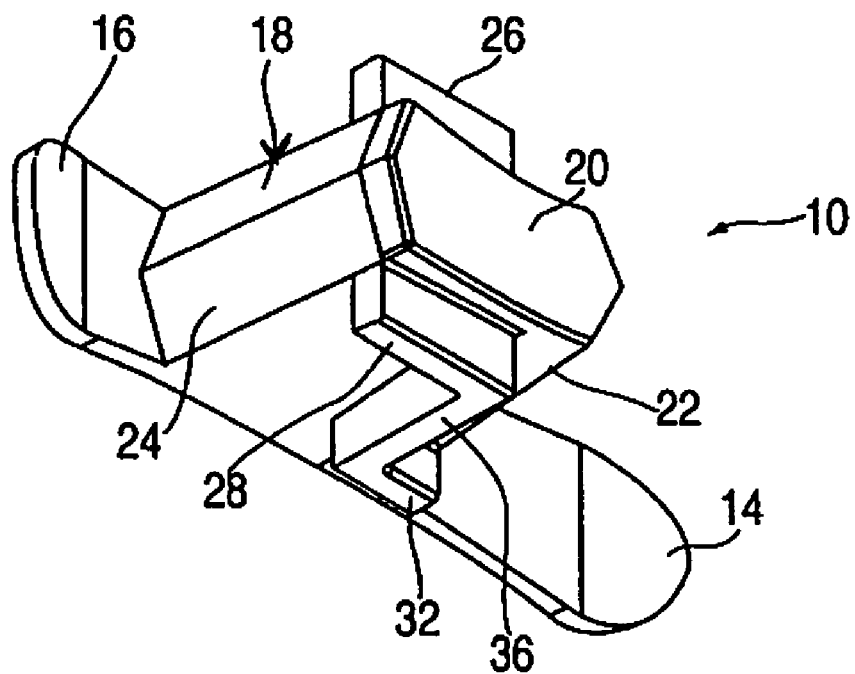
FIG. 5 is a rear perspective view of the snowboard of FIG. 1.

The top 20 of the seat portion 18 is preferably a concave curved surface as seen best in FIGS. 1 and 5. The front and rear walls 22, 24 are preferably beveled, as seen best in FIGS. 3 and 5, for strength and rigidity. The seal portion 18 is provided with a pair of laterally outwardly extending hand grips 26, 28 below the upper curved top surface 20 but closer to the top surface 20 than the bottom board 12. In addition, the seat portion 18 is provided with a pair of laterally outwardly extending foot rests 30, 32, as seen best in FIGS. 2-4. As shown, a pair of leg rests 34, 36 extend laterally outward from the seat portion 18 and downwardly from the hand grips 26, 28 to the foot rests 30, 32. The foot rests 30, 32 extend forward from the leg rests 34, 36 and are located closer to the bottom board 12 than the hand grips 28. As seen best in FIG. 5, the edges of the lop surface 20, hand grips 26, 28, leg rests 34, 36 and foot rests 30, 32 may be chamfered or beveled. The orientation and positioning of the leg and foot rests allows the user to sit on the snowboard straddling the seat portion 18 similar to the seat position of a user riding a motorcycle.

Referring back to FIG. 2, bottom board 12 is preferably provided with a narrow waist 38 so that the rider can turn left or right by leaning to the side and tilting the board onto an edge of the bottom board for turning. The underside of bottom board 12 is preferably scored with parallel, longitudinally extending, slightly raised ribs or runners 40 to keep snowboard 10 sliding in a desired direction of travel in both icy and wet conditions. This ribbed bottom surface serves to prevent side or lateral slipping of the snowboard and to maintain the snowboard in the desired direction of travel.

Turning now to FIGS. 6-11, a second embodiment 110 of the invention is shown. The second embodiment is similar to the first embodiment and similar features are referred to with similar reference numerals (increased by 100). The snowboard 110 according to aspects of the present disclosure is composed of two pieces of molded plastic that are rotationally and/or injection molded. The snowboard 110 may alternatively be composed of a single piece or multiple pieces and may be milled, grown, molded or formed in any other suitable manner. The snowboard 110 includes a bottom board 112 having an upturned head 114 and an upturned tail 116 as seen best in FIGS. 6, 7, and 9-11. An upstanding seat portion 118 is formed as a separate piece as shown best in FIGS. 7 and 8.

Figure 7:
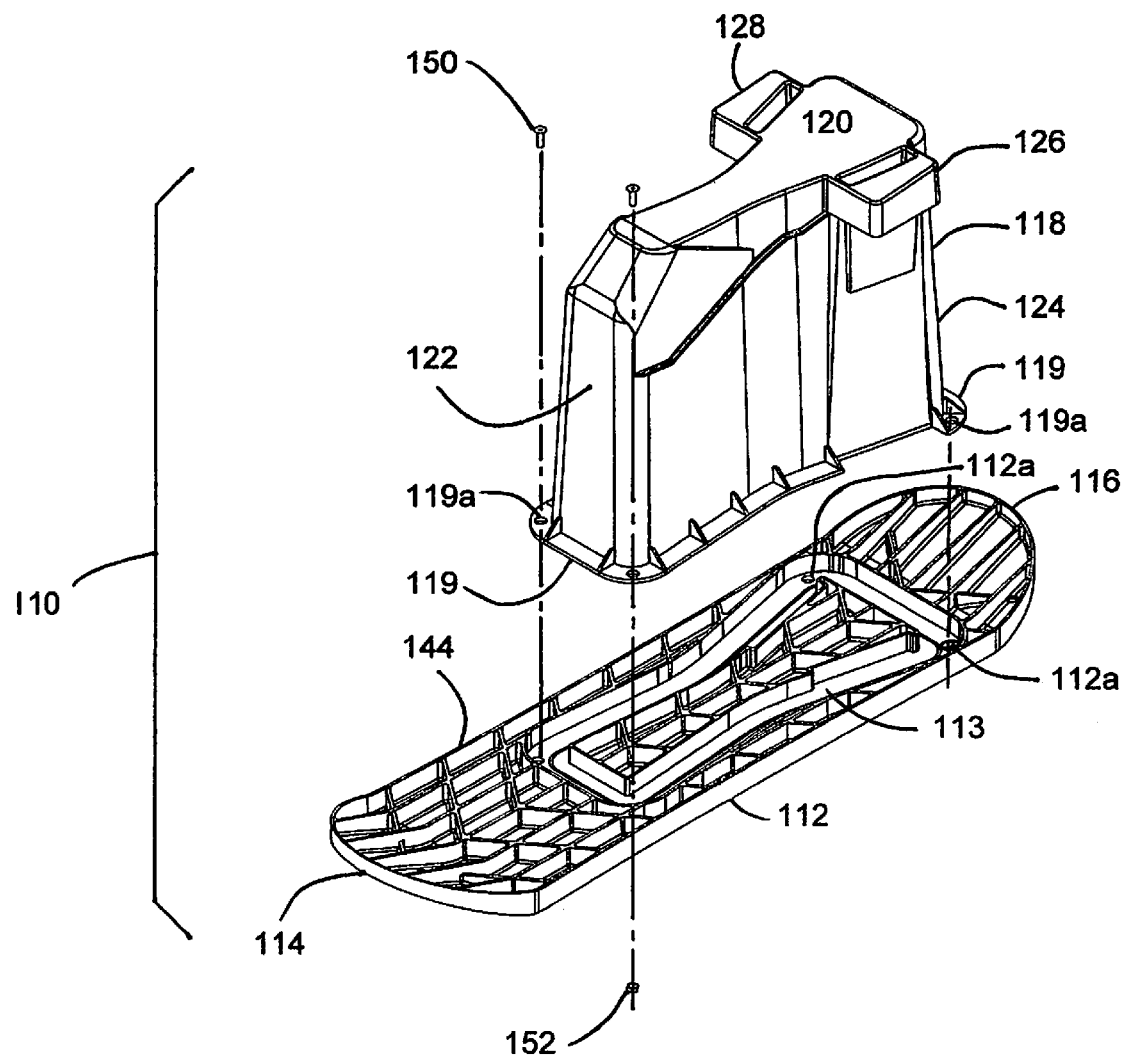
FIG. 7 is an exploded perspective view of the snowboard of FIG. 6 illustrating the two pieces before joining.

The seat portion 118 is attached to the bottom board 112, as shown in FIG. 7, at a location between the head 114 and the tail 116. More particularly, the seat portion 118 has one or more lower flange(s) 119 which is affixed to a matching smooth flat portion 113 of the of the bottom board 112. Lower flange 119 includes openings 119a extend thereabout. Openings 119a correspond to openings 112a formed in the bottom board 112. Openings 112a, 119a are configured to receive nuts 152 and bolts 150, respectively, for affixing seat portion 118 to bottom board 112. Alternatively, affixation of bottom board 112 and seat portion 118 may be accomplished through adhesion, ultrasonic welding, or other suitable method.

Figure 11:
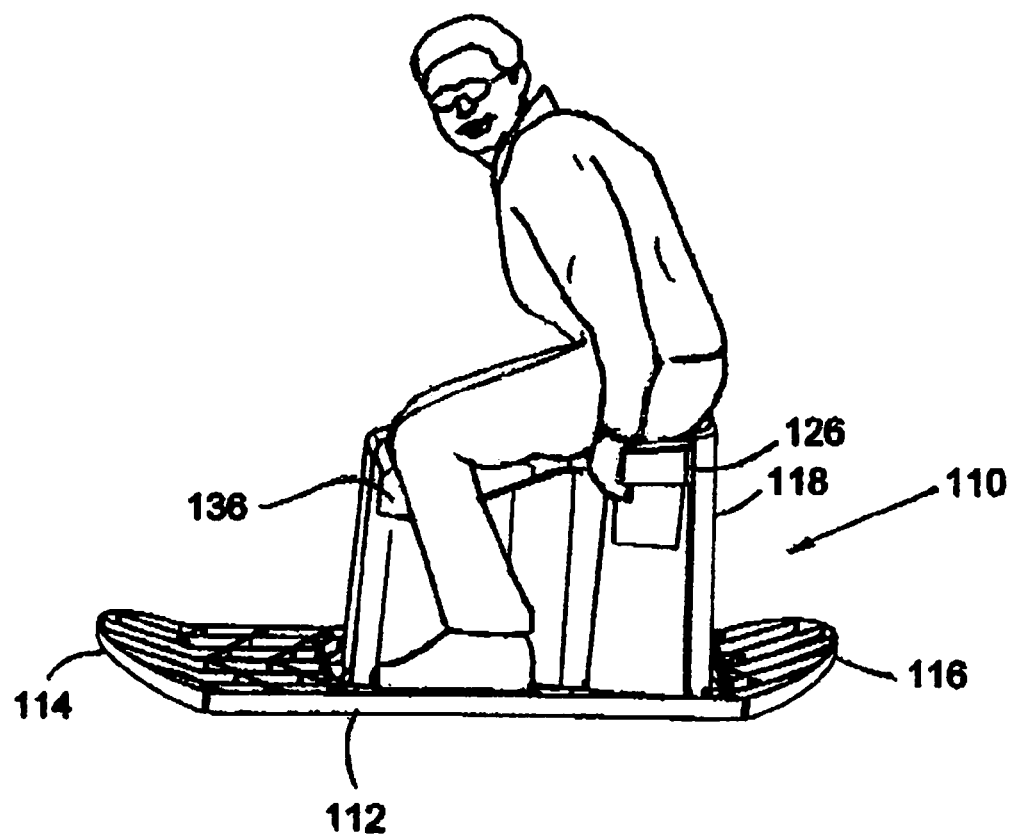
FIG. 11 is a side elevation view illustrating a user sitting on the seat portion with his feet on the bottom board.

When the seat portion 118 is affixed to the bottom board 112, it extends upward from the bottom board 112 at a location between the head 114 and the tail 116. The seal portion 118 is located slightly closer to the tail 116 as seen best in FIGS. 6 and 9. In this manner, snowboard 110 is provided with a proper center of gravity when a rider is sitting on the seat portion 118 as shown in FIG. 11. The top 120 of the seat portion 118 is a concave curved surface. The front and rear walls 122, 124 are somewhat rounded, as seen best in FIGS. 7 and 8. As will be discussed in further detail below, the seat portion 118 includes opposite side walls 134, 136 configured to accommodated the lower extremities of a rider.

Figure 9:
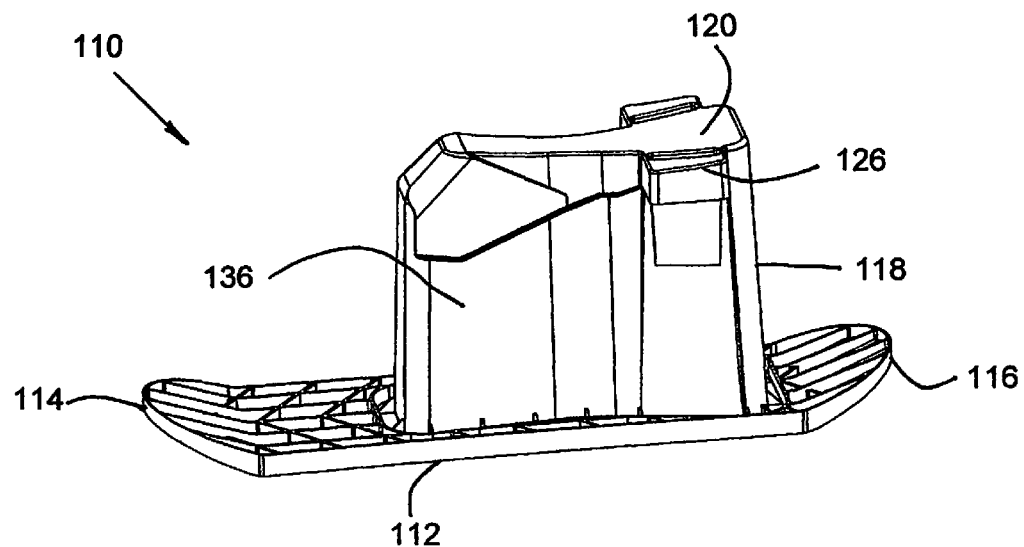
FIG. 9 is a side elevation view of the snowboard of FIG. 6.

The seat portion 118 is provided with a pair of hand grips 126, 128 laterally outwardly extending for the opposite side walls 134, 136, respectively, below the upper curved top surface 120 but closer to the top surface 120 than the bottom board 112 as seen best in FIG. 9. As seen test in FIG. 6, the edges of the top surface 120 and the hand grips 126, 128 are chamfered or beveled to reduce any sharp edges that may be exposed to the seated rider.

Figure 6:
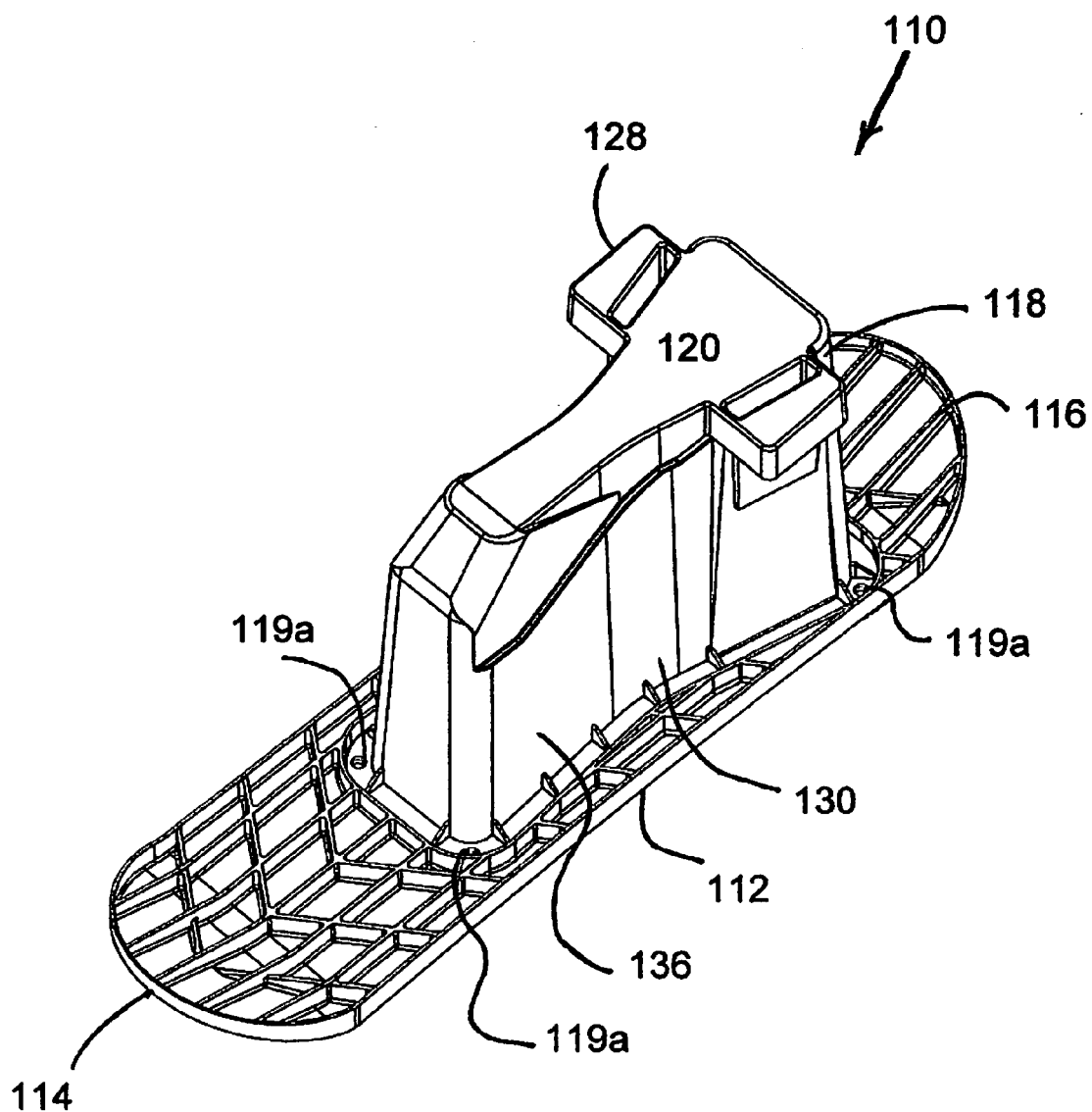
FIG. 6 is a top perspective view of a snowboard according to a second embodiment of the invention.
Figure 8:
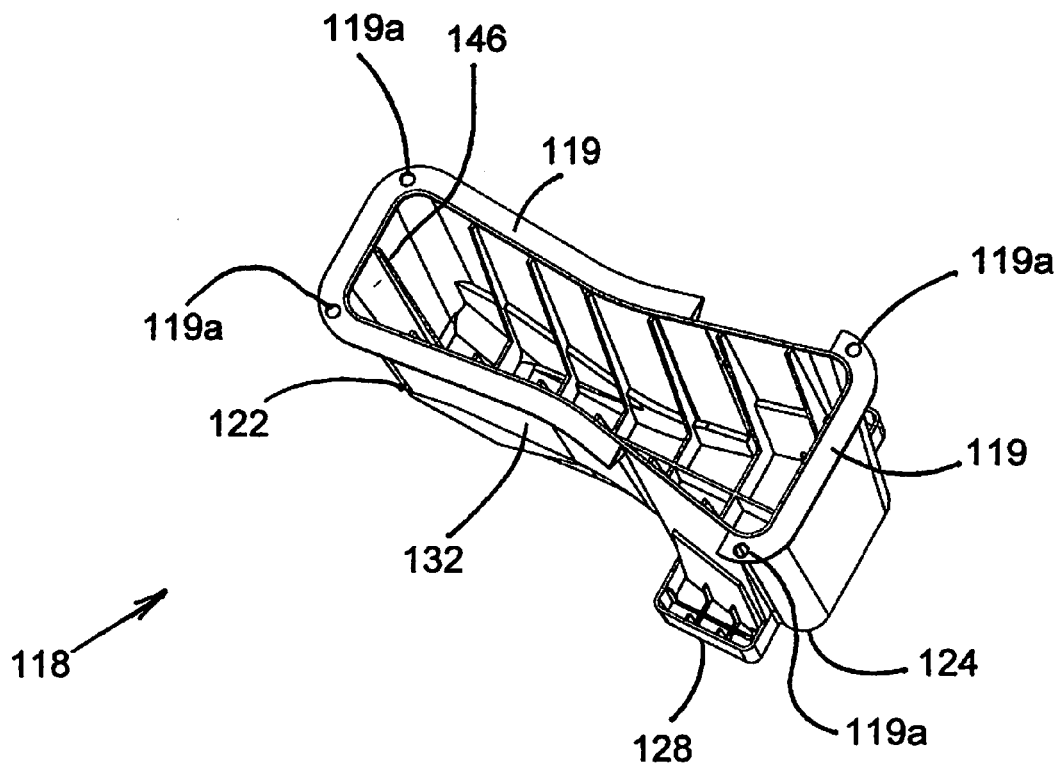
FIG. 8 is a bottom perspective view of the seat portion of the snowboard of FIG. 6.

The opposite side walls 134, 136 are further provided with a waist 130, 132 forward of the hand grips 126, 128 as seen best in FIGS. 6 and 8. Waist 130, 132 provides space on the bottom board 112 where the rider can place his/her feet as shown in FIG. 11. The rider can control the speed of the board by moving his/her feet off the board and allowing them to drag alongside the board. Forward of the waist 130, 132 the opposite side walls 134, 136 are configured to be selectively squeezed between the thighs, knees and/or legs of the rider. In this manner, the rider may feel more securely engaged with the snowboard 110. The opposite side walls 134, 136 may be expanded, tapered, molded or otherwise formed to accommodate the lower extremities of the rider. The orientation and positioning of the top surface 120, the opposite side walls 134, 136 and hand grips 126, 128 allows the user to sit on the snowboard straddling the seat portion 118 similar to the seat position of a user riding a motorcycle as shown in FIG. 11. This configuration permits a user to feel a sense of direct connection to the snow hill with his/her entire lower body.

Figure 10:
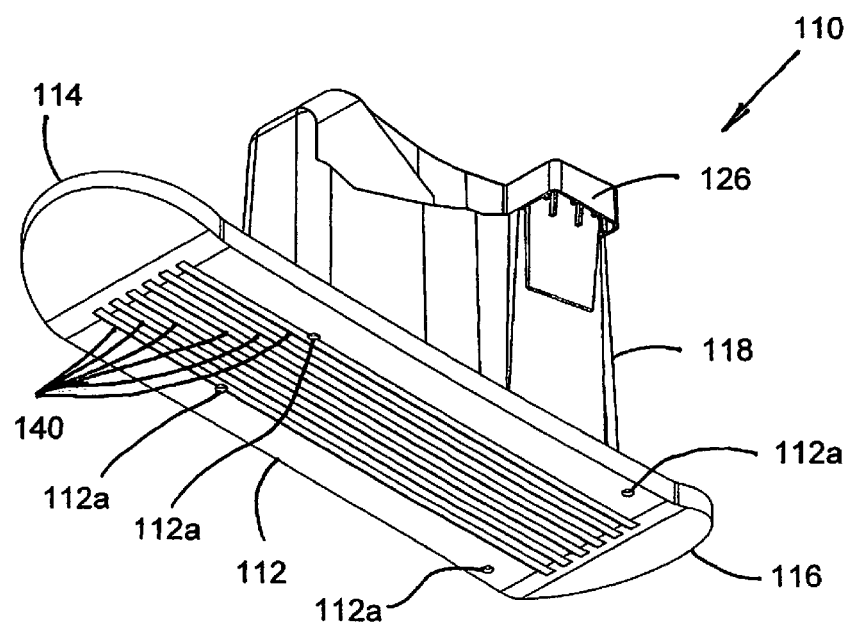
FIG. 10 is a bottom perspective view of the snowboard of FIG. 6.

As seen best in FIG. 10, the bottom of the board 112 is preferably scored with parallel, longitudinally extending, recessed channels 140 to keep board 112 sliding straight in all conditions, including on ice and in wet snow. This channeled bottom surface serves to prevent side or lateral slipping of the snowboard and to maintain the snowboard in a desired direction of travel.

As seen best in FIG. 7, the upper surface of bottom board is strengthened by a lattice of ribs 144 which extend front to back and side to side except in the area 113 where the seat portion 118 attaches to the bottom board 112. Similarly, as seen best in FIG. 8, the interior of the seal portion is strengthened by a lattice of ribs 146. The ribs are formed as part of the molding process.

The snowboards according to the present disclosure mix the sensations of snowboarding with those of motorcycling. In addition, snowboards according to the present disclosure are designed to permit those riders with a lot less sense of balance than is typically required for snowboarding to adeptly ride and operate this novel sealed snowboard.

There have been described and illustrated herein two illustrative embodiments of an upright seated snowboard with integrated hand grips and foot rests. While particular aspects of the embodiments have been described, it is not intended that the disclosure necessarily he limited thereto, as it is intended mat the aspects of the disclosure be as broad in scope as the art will allow and that the specification be read likewise. It will therefore be appreciated by those skilled in the art that yet other modifications could be made to the aspects of the present disclosure without deviating from its spirit and scope as claimed.

What is claimed is:

1. A snowboard, comprising:
a board having a head, a tail and bottom surface configured for engaging a snow or ice covered surface;
a seat portion extending upward from the board at a location between the head and tail, the seat portion including a top surface and opposite lateral sides, wherein the top surface is configured for seated engagement by a rider and the opposite lateral sides include a waist about a longitudinal centerline of the board configured to accommodate the legs and feet of the rider between a forwardmost end and a rearwardmost end of the seat portion; and
a pair of hand grips extending outward from the opposite lateral sides of the seat portion near the top surface, wherein the seat portion and the pair of hand grips are integrally formed.

2. The snowboard according to claim 1, wherein the waist is a narrow waist.

3. The snowboard according to claim 1, wherein the top surface of the seat portion is a concave curved surface.

4. The snowboard according to claim 1, wherein the seat portion is closer to said tail than said head.

5. The snowboard according to claim 1, including runners separated by longitudinally-extending channels.

6. The snowboard according to claim 1, wherein the board and seat portion are constructed of plastic.

7. The snowboard according to claim 1, wherein the board and seat portion are formed of a single piece.

8. The snowboard according to claim 1, wherein the seat portion has a beveled front wall and a beveled rear wall.

9. The snowboard according to claim 1, wherein the board may be constructed by rotational molding, injection molding, growing or milling.

10. The snowboard according to claim 1, wherein the seat portion is constructed by rotational molding, injection molding, growing or milling.

11. The snowboard according to claim 1, wherein the board is reinforced with a lattice of ribs.

12. The snowboard according to claim 1, wherein the seat portion is secured to the board using mechanical fasteners.

13. The snowboard according to claim 1, wherein the mechanical fasteners are nuts and bolts.

14. The snowboard according to claim 1, wherein the bottom surface of the board includes runners.

15. The snowboard according to claim 1, wherein the bottom surface of the board includes channels.

16. The snowboard according to claim 1, wherein the seat portion is substantially hollow.

17. The snowboard according to claim 1, wherein the pair of handgrips are located between the top surface of the seat portion and the board.

* * * * *